(12) United States Patent
Henson et al.

(10) Patent No.: US 8,029,020 B2
(45) Date of Patent: Oct. 4, 2011

(54) TRAILER JACK KICKSTAND

(76) Inventors: William Henson, Cassville, MO (US);
Debbie Henson, Cassville, MO (US)

( * ) Notice: Subject to any disclaimer, the term of this patent is extended or adjusted under 35 U.S.C. 154(b) by 0 days.

(21) Appl. No.: 12/648,347

(22) Filed: Dec. 29, 2009

(65) Prior Publication Data

US 2011/0156379 A1 Jun. 30, 2011

(51) Int. Cl.
*B60S 9/04* (2006.01)
(52) U.S. Cl. .................................... 280/763.1; 280/475
(58) Field of Classification Search .................. 280/762, 280/763.1, 764.1, 765.1, 766.1; 248/354.5
See application file for complete search history.

(56) References Cited

U.S. PATENT DOCUMENTS

| | | | | |
|---|---|---|---|---|
| 780,201 | A * | 1/1905 | Knox | 280/763.1 |
| 1,857,611 | A * | 5/1932 | Swift | 280/764.1 |
| 2,680,028 | A * | 6/1954 | Cook | 280/763.1 |
| 2,734,726 | A * | 2/1956 | Gebhart | 254/424 |
| 3,093,362 | A * | 6/1963 | Schaefer | 254/424 |
| 3,104,891 | A * | 9/1963 | Dalton | 280/763.1 |
| 3,146,002 | A * | 8/1964 | Faber | 280/763.1 |
| 3,281,160 | A * | 10/1966 | Vinther et al. | 254/420 |
| 3,315,973 | A * | 4/1967 | Marple | 280/656 |
| 3,614,064 | A * | 10/1971 | Bennett | 254/418 |
| 3,857,582 | A * | 12/1974 | Hartog | 280/764.1 |
| 3,879,055 | A * | 4/1975 | Sill et al. | 280/763.1 |
| 4,084,656 | A * | 4/1978 | Itoh et al. | 180/219 |
| 4,162,798 | A * | 7/1979 | Foley | 280/475 |
| 4,176,825 | A * | 12/1979 | Schwebke | 254/94 |
| 4,241,933 | A * | 12/1980 | Gratza et al. | 280/301 |
| 4,417,746 | A * | 11/1983 | Baron | 280/301 |
| 4,635,904 | A * | 1/1987 | Whittingham | 254/425 |
| 4,775,164 | A * | 10/1988 | Jan | 280/303 |
| 4,883,284 | A * | 11/1989 | Nakazawa et al. | 280/293 |
| 4,971,347 | A * | 11/1990 | Cline | 280/301 |
| 4,993,677 | A * | 2/1991 | Patterson | 248/351 |
| 5,067,746 | A * | 11/1991 | Baker | 280/763.1 |
| 5,451,080 | A * | 9/1995 | Kneile | 248/354.1 |
| 5,497,969 | A * | 3/1996 | Broughton | 248/352 |
| 5,575,492 | A * | 11/1996 | Stone | 280/475 |
| 5,711,504 | A * | 1/1998 | Cusimano | 248/354.3 |
| 5,803,475 | A * | 9/1998 | Dick | 280/163 |
| 6,105,940 | A * | 8/2000 | Charette | 254/423 |
| 6,141,997 | A * | 11/2000 | Blehi, III | 70/56 |
| 6,425,604 | B1 * | 7/2002 | Schubert et al. | 280/763.1 |
| 6,494,445 | B1 * | 12/2002 | Bellis, Jr. | 269/71 |
| 6,511,279 | B1 * | 1/2003 | Harkcom et al. | 414/537 |
| 6,619,693 | B1 * | 9/2003 | Sproatt et al. | 280/764.1 |
| 6,726,236 | B2 * | 4/2004 | Cofer | 280/475 |
| 6,726,247 | B1 * | 4/2004 | Snyder | 280/766.1 |

(Continued)

*Primary Examiner* — J. Allen Shriver, II
*Assistant Examiner* — Brodie Follman
(74) *Attorney, Agent, or Firm* — Jerry Hagnes; Law Office of Jerry D. Haynes

(57) ABSTRACT

A trailer jack stand for supporting a trailer comprising: a pedestal stand, where stand attaches to a trailer jack, said stand includes a top connecting section and a pivoting section; a center mount pin, where the mount pin attaches the stand to the jack through the top connecting section; a locking pin, where the locking pin secures the mount pin into place; a platform, where the platform attaches to the bottom of the pivoting section; and a spring assembly, where the spring assembly includes a top pivot pin extending from the top connecting section, a stand pin extending from the pivoting section and a spring attached between the pivot pin and stand pin. The pivoting section is capable of pivoting between a retracted position and an extended position, where in the extended position the stand supports the trailer.

9 Claims, 1 Drawing Sheet

U.S. PATENT DOCUMENTS

| | | | |
|---|---|---|---|
| 6,729,595 B2 * | 5/2004 | Smith | 248/518 |
| 7,237,803 B2 * | 7/2007 | Nguyen | 280/767 |
| 7,311,332 B2 * | 12/2007 | Baxter et al. | 280/766.1 |
| 7,350,480 B1 * | 4/2008 | Hughes | 119/512 |
| 7,395,993 B2 * | 7/2008 | Riedl | 248/188.8 |
| 7,396,034 B2 * | 7/2008 | Wilson, Jr. | 280/475 |
| 7,425,012 B1 * | 9/2008 | Sease | 280/475 |
| 7,654,570 B2 * | 2/2010 | Giralde | 280/766.1 |
| 2002/0053794 A1 * | 5/2002 | Fender | 280/766.1 |
| 2003/0020270 A1 * | 1/2003 | Cofer | 280/763.1 |
| 2004/0000778 A1 * | 1/2004 | Ouellette | 280/763.1 |
| 2004/0105733 A1 * | 6/2004 | Hewitt | 410/66 |
| 2005/0073141 A1 * | 4/2005 | Baird et al. | 280/766.1 |
| 2005/0127620 A1 * | 6/2005 | Amundson | 280/6.153 |
| 2006/0043695 A1 * | 3/2006 | Wilson, Jr. | 280/475 |
| 2006/0119089 A1 * | 6/2006 | Rivers et al. | 280/763.1 |
| 2006/0163858 A1 * | 7/2006 | Giralde | 280/763.1 |
| 2007/0040369 A1 * | 2/2007 | Lotman | 280/763.1 |
| 2007/0152437 A1 * | 7/2007 | Baxter et al. | 280/763.1 |
| 2007/0221900 A1 * | 9/2007 | Giralde | 254/418 |
| 2009/0179400 A1 * | 7/2009 | Van Der Plaats et al. | 280/431 |
| 2009/0212532 A1 * | 8/2009 | Kudo | 280/301 |
| 2010/0066068 A1 * | 3/2010 | McMahan | 280/763.1 |

* cited by examiner

TRAILER JACK KICKSTAND

BACKGROUND OF THE INVENTION

1. Field of Invention

The present invention relates to a trailer jack kickstand that may be utilized to support a trailer frame for leveling and support purposes.

2. Description of Related Art

Trailers are used to transport equipments, vehicles, cargo and other items where the trailer is hitched to a truck or a similar moving vehicle. The trailer itself is configured and formed to accommodate the cargo or equipment that is being transported. The trailers were hitched to a rear-mounting pin on a vehicle known as a hitch and secured in place for transport. The trailer stand provides a means to suspend or support an unhitched portion of the trailer. The trailer usually includes wheels on each side and a hitch attachment at the front portion or tongue of the trailer. Many trailers include a jack attachment that connects to the frame to support the front portion while hitching and unhitching a vehicle. The jack provides movement vertically to position the trailer in a suitable position over the hitch and allows the user to center the trailer upon the hitch of the vehicle. When unhitched from the vehicle the jack is usually extended in order to contact the ground surface area under the trailer to support the front end thereof.

The jack provides the vertical movement of the trailer and usually includes a telescoping base that meets the ground or allows for the insertion of a stand or platform to support the jack in an extended position. The platform stand provides a means to stabilize the jack in its extended position and to support the trailer when unhitched from the vehicle. Examples of a trailer jack stand include U.S. Pat. No. 4,662,610 which discloses a jack stand or support for a trailer jack having a vertically extending housing and an extendable plunger telescopically contained by the end of the jack housing including an upright member mounted on a flat base. The jack stand disclosed in the '610 patent pivots into a position to provide support for the tongue of the trailer. U.S. Patent Application No. 2009/0236577 discloses a dual mode jack foot designed for attachment to the base of commercially available trailer jacks. The jack foot of the '577 patent application pivots into position to provide a support mechanism when deployed.

SUMMARY OF THE INVENTION

The present invention relates to a trailer jack stand for supporting a trailer comprising: a pedestal stand, where stand attaches to a trailer jack, said stand includes a top connecting section and a pivoting section; a center mount pin, where the mount pin attaches the stand to the jack through the top connecting section; a locking pin, where the locking pin secures the mount pin into place; a platform, where the platform attaches to the bottom of the pivoting section; and a spring assembly, where the spring assembly includes a top pivot pin extending from the top connecting section, a stand pin extending from the pivoting section and a spring attached between the pivot pin and stand pin. The pivoting section is capable of pivoting between a retracted position and an extended position, where in the extended position the stand supports the trailer. In one exemplary embodiment, a welded seam attaches the platform to the stand.

DETAILED DESCRIPTION

The present invention provides a trailer jack kickstand that attaches to a trailer jack to provide a means for support and positioning of a trailer. The trailer jack kickstand according to the present invention is a spring loaded jack extension apparatus that easily kicks up or pivots down into a support position and does not use a conventional means of positioning for a jack stand.

Figure 1:
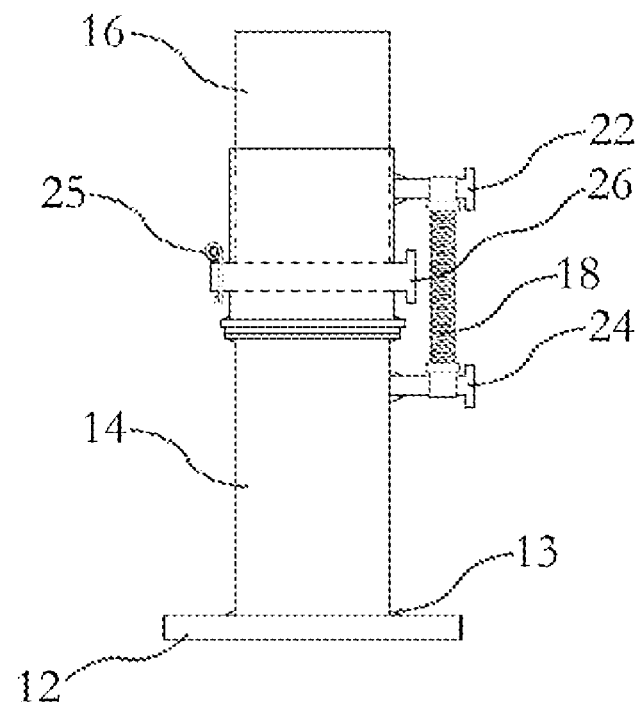
FIG. 1 depicts the trailer jack kickstand according to the present invention.

FIG. 1 depicts a trailer jack stand 14 according to the present invention in a down position providing support for a trailer jack 16. The jack kickstand 14 extends downward under the trailer jack 16 to support the trailer, not shown. The stand 14 connects to the trailer jack 16 through the use of a center mount pin 26 and a locking pin 25 when a top portion of a top connecting section of the trailer jack stand is fitted over a bottom portion of the trailer jack as shown. This mechanism secures the stand 14 into position and onto the jack 16. The locking pin 25 ensures that the center mount pin 26 does not move horizontally or is accidentally dislodged once put into place. The stand 14 includes a platform 12 that is welded onto the stand 14 using a weld seam 13. The platform 12 includes a bottom platform surface 15 depicted in FIG. 2. The bottom platform surface 15 abuts the ground or surface area that supports the trailer. The stand 14 pivots into place through the use of a spring assembly 18 that extends from a top pivot pin 22 to a stand pin 24.

Figure 2:
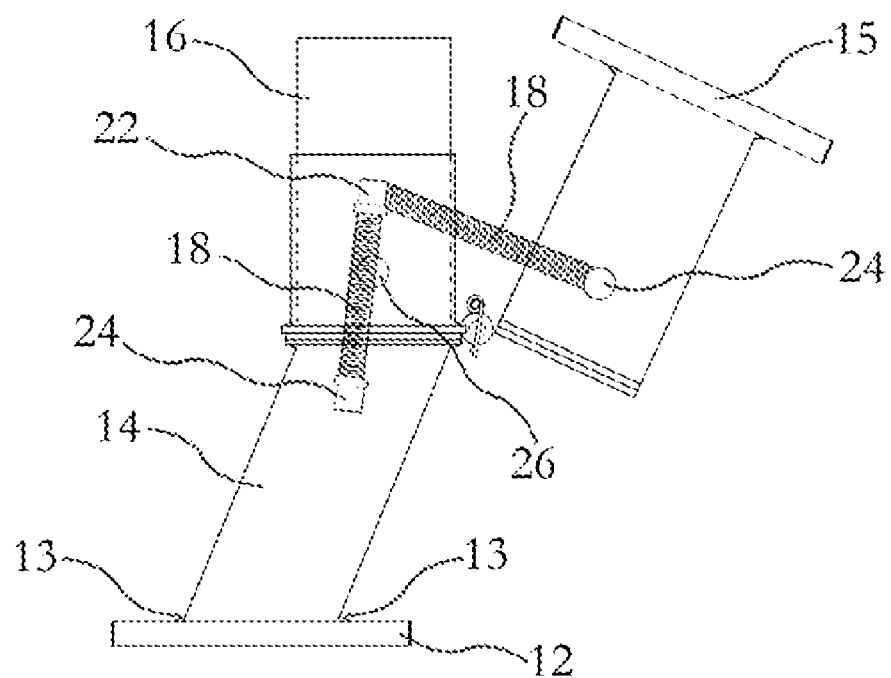
FIG. 2 shows a side view of the trailer jack kickstand according to the present invention demonstrating the swivel movement thereof.

FIG. 2 shows the movement of the stand 14 from a retracted position to an extended position supporting the jack 16. As can be seen, the spring 18 extends from pin 22 to stand pin 24. In the retracted position the spring 18 is extended and holds the stand in a retracted position vertically. When the user desires to extend the stand 14 to a supporting position and abut the platform surface 15 into the ground, he or she may merely manually kick the stand 14 into position under the jack 16. The tension of the spring 18 is relieved while the stand 14 is in an upright position to support jack 16. The weld seam 13 extends around the base of the stand 14 to attach the platform 12.

As shown, the stand 14 may easily pivot into an upright supporting position (extended position) and then be relieved of the upright support position, retracted and held in place with the spring 18 in a retracted position. The mechanism and positioning of the stand 14 is efficient and uses minimal effort to place the stand in a support position under the jack 16. The stand 14 is essentially spring loaded to retract or to extend in position under the jack 16. It is not necessary to use any cranking or any other extreme methods to place the stand 14 into place and it eliminates the need for items such as cinder blocks or such to provide support for the trailer while adjustments and modifications may be taking place.

What is claimed is:

1. A trailer jack stand for supporting a trailer comprising:
   a. a stand, where the stand attaches to a trailer jack, and where the stand includes a top connecting section and a pivoting section and wherein the stand and trailer jack are connected by fitting a top portion of the top connecting section of the stand over a bottom portion of the trailer jack;
   b. a center mount pin, where the mount pin attaches the stand to the trailer jack through the top connecting section;

c. a locking pin, where the locking pin secures the mount pin into place;
d. a platform, where the platform attaches to the bottom of the pivoting section; and
e. a spring assembly, where the spring assembly includes:
   i. a top pivot pin extending from the top connecting section,
   ii. a stand pin extending from the pivoting section and
   iii. a spring attached between the pivot pin and stand pin where the tension of the spring increases when the pivoting section is in a retracted position and decreases when the pivoting section is in an extended position.

2. The trailer jack stand according to claim 1, where a welded seam attaches the platform to the stand.

3. The trailer jack stand according to claim 1, where in the extended position the stand supports the trailer.

4. A trailer jack stand for supporting a trailer comprising:
a. a stand, where stand attaches to a trailer jack, the stand includes a top connecting section and a pivoting section and wherein the stand and trailer jack are connected by fitting a top portion of the top connecting section of the stand over a bottom portion of the trailer jack;
b. a center mount pin, where the mount pin attaches the stand to the trailer jack through the top connecting section;
c. a means to secure the mount pin into place;
d. a platform, where the platform attaches to the bottom of the pivoting section; and
e. a means to pivot the pivoting section between a retracted position and an extended position where the means to pivot the pivoting section includes a spring and where the tension of the spring increases when the pivoting section is in the retracted position and decreases when the pivoting section is in the extended position.

5. The trailer jack stand according to claim 4, where the means to secure the mount pin, includes a locking pin.

6. The trailer jack stand according to claim 4, where the means to pivot the pivoting section includes a spring assembly, where the spring assembly includes a top pivot pin extending from the top connecting section, a stand pin extending from the pivoting section and the spring attached between the pivot pin and stand pin.

7. The trailer jack stand according to claim 4, where a welded seam attaches the platform to the stand.

8. The trailer jack stand according to claim 3, where the stand moves from the retracted position to the extended position when a user kicks the stand.

9. The trailer jack stand according to claim 4, where the means to pivot the pivoting section between a retracted position to an extended position is to kick the stand into position under the trailer jack.

* * * * *